Sept. 19, 1967 A. E. CROUCH 3,343,079
APPARATUS AND METHOD FOR ELECTROMAGNETICALLY
DISTINGUISHING BETWEEN OUTSIDE AND INSIDE
FLAWS IN MAGNETIZABLE MEMBERS UTILIZING
A LEAKAGE FIELD DETECTOR
Filed July 1, 1963
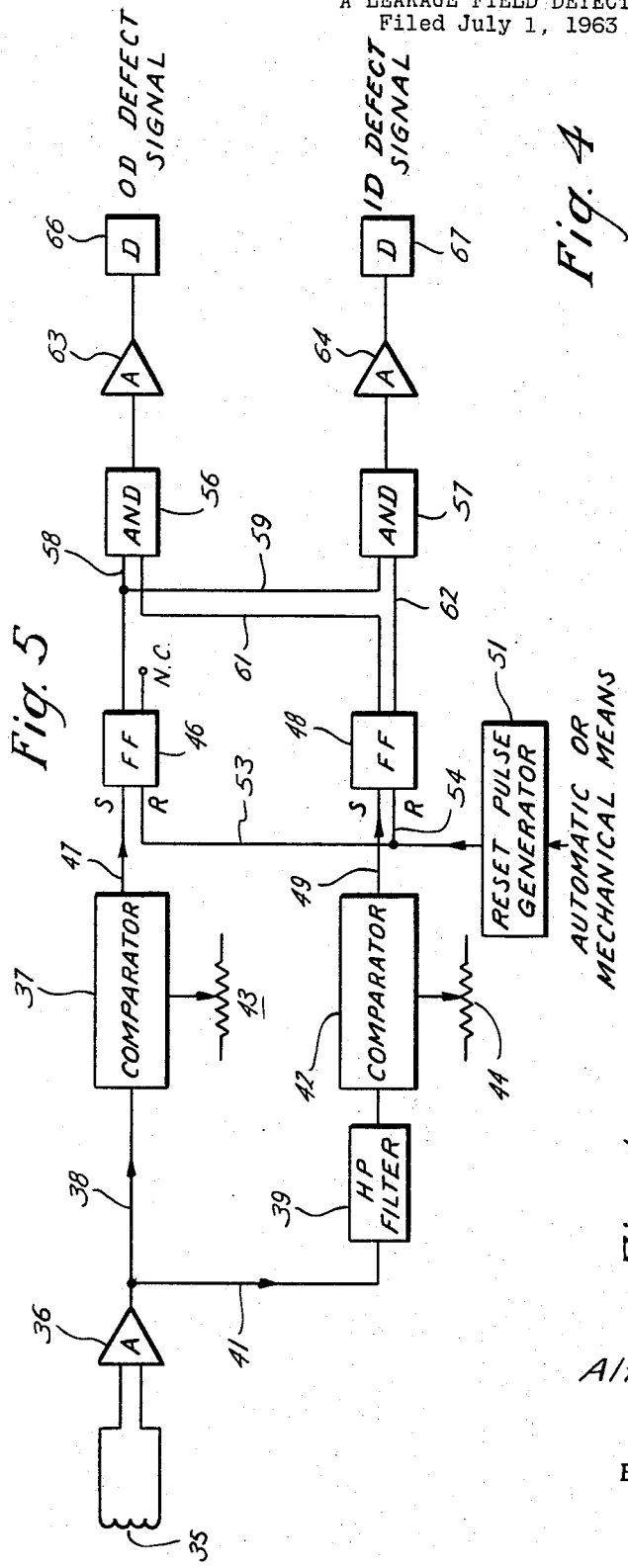
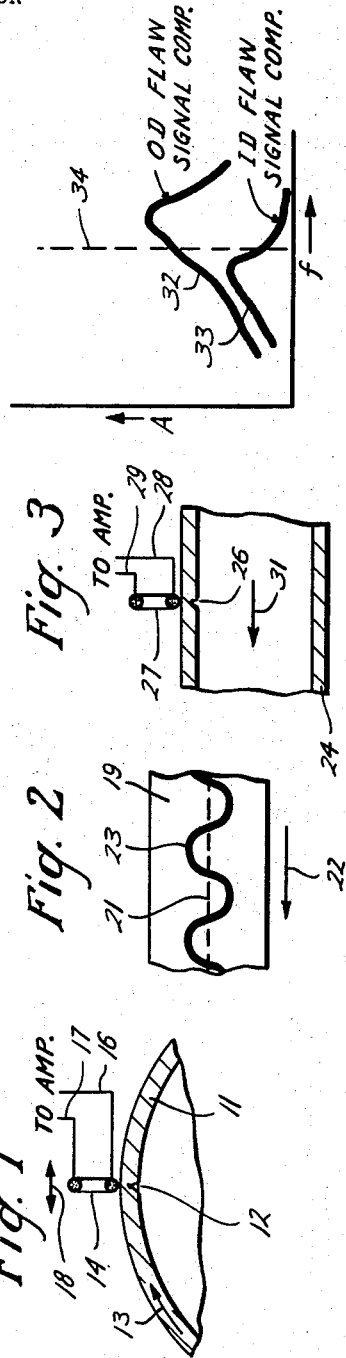
Alfred E. Crouch
INVENTOR.
BY Arnold, Roylance & Harris
ATTORNEYS

United States Patent Office 3,343,079
Patented Sept. 19, 1967

3,343,079
APPARATUS AND METHOD FOR ELECTROMAGNETICALLY DISTINGUISHING BETWEEN OUTSIDE AND INSIDE FLAWS IN MAGNETIZABLE MEMBERS UTILIZING A LEAKAGE FIELD DETECTOR
Alfred E. Crouch, Houston, Tex., assignor, by mesne assignments, to American Machine & Foundry Company, New York, N.Y., a corporation of New Jersey
Filed July 1, 1963, Ser. No. 291,750
7 Claims. (Cl. 324—37)

This invention relates to a magnetic flux leakage inspection apparatus and method for testing magnetizable tubular members for defects. More particularly, the invention relates to a magnetic inspection apparatus and method for continuously testing a magnetizable tubular member, wherein variations in flux leakage from the wall of said member caused by defects in said member are applied to a readout means or logic circuit which indicates the relative size and location of defects in the tubular member.

In the magnetizable pipe inspection art their has long been a need for a relatively simple apparatus and method which could be used to inspect such members, and provide an accurate and continuous indication of the relative size and location of defects in said pipe. In this application, the term outside (OD) defect will be used to denote a defect which opens to the outside surface of the wall of the pipe or the surface adjacent to which the inspection means is employed. The term inside defect will be used to denote defects which open to the inside surface of the wall of a pipe or the surface opposite the surface to which the inspection means is employed and/or, defects which are included within the wall of the pipe and do not open to either surface of the pipe wall.

One of the reasons that the determination of the relative size and location of a flaw in a pipe wall is rendered difficult is because an inside flaw of a given magnitude will, because of its greater distance from the scanning device, give a different reading than an outside defect of the same magnitude. Hence, knowledge of the location of the defect permits more accurate evaluation of the particular flaw which the signal represents.

For example, in the electrical resistance welding art, pipe is formed with a weld line. Quite often this weld line will have defects formed therein when the welding operation conditions are not optimum. Thus, an inspecting apparatus which can continuously indicate the location and relative size of defects formed during the welding process can be used to adjust the welding conditions in forming subsequent portions of the pipe, and thereby avoid further defects above specified tolerances.

Many prior art apparatuses and methods are available for magnetically inspecting pipe, but none are fully satisfactory to the extent of the present invention for various reasons. Some prior art apparatuses employ two methods of testing, but are not continuous in their operation, and/or require the use of delay circuits or the like. Other prior art apparatuses employ certain filtering techniques to isolate various flaw signal components, but are not adapted to provide a ready readout as to the location and size of the defect, or are not continuous in their operation, or are otherwise not as fully satisfactory as is the present invention.

It is therefore an object of this invention to provide an apparatus and method for inspecting magnetizable tubular members for defects in the wall of said members and providing indications as to the size and location of such defects.

It is another objective of this invention to provide an apparatus and continuous method for magnetically inspecting the wall of a tubular member from either the inside or outside surface and to provide indications of the location and relative size of the defect.

These and other objectives of the invention will become apparent with the description of the invention.

Briefly the present invention contemplates an apparatus and method for testing magnetizable tubular goods such as pipe formed by electrical welding drill pipe or the like, for defects in the wall of said pipe which apparatus and method employs a unidirectional magnetic field such as a circumferential magnetic field or a longitudinal magnetic field in the wall of the pipe being inspected.

Magnetic responsive means as for example search coils, are provided which means are responsive to flux leakage from the unidirectional field as indications of both inside and outside defects in the wall of the pipe.

A readout means in the form of a logic circuit is provided to give indications as to whether or not the defects are inside or outside and the relative size thereof. This logic circuit basically employs two electrical circuits the major component of each being an AND circuit or its equivalent. One of these circuits is energized by two electrical impulses, the first of which is produced when the magnetic responsive means detects a defect above a preselected level, and the second of which is produced when the high frequency components of the defect signals are above a preselected level.

The other electrical circuit is arranged to receive said first electrical impulses the same as the first circuit, but receives the second electrical impulses in inverted form as will be explained below.

By the novel arrangement of this logic circuit, one of the electrical circuits is arranged to indicate outside defects and the other of the electrical circuits indicates inside defects, all as a result of the variations in flux leakage detected by the magnetic responsive means.

The invention is further illustrated by the drawings wherein like numerals refer to like structures and in which:

FIG. 1 is a schematic cross-section of a pipe and search coil showing the relative location and direction of movement of one form of the magnetic responsive means of this invention.

FIG. 2 is a schematic plan view of a pipe with a weld line and showing the movement of the magnetic responsive means relative thereto.

FIG. 3 is a side view in central section of a pipe showing another method of using a magnetic responsive means in one form of this invention.

FIG. 4 is a graph showing the components of the flaw signal detected by the magnetic responsive means.

FIG. 5 is a block diagram showing one embodiment of the logic circuit of the invention.

Referring to FIG. 1, there is generally shown a magnetizable tubular member in the form of pipe 11, having longitudinal inside defect 12 and a unidirectional magnetic field in the form of a circumferential magnetic field shown by arrow 13, which field is established by conventional means (not shown).

Positioned closely adjacent to the outside surface of the wall of pipe 11 is a magnetic responsive means in the form of a small multi-turn flux leakage search coil 14, having leads 16 and 17 connected to amplifier means (not shown).

When testing for longitudinal defects, as for example defects in the weld line of the pipe, it is advantageous to pass the magnetic responsive means closely adjacent the surface of the pipe in a direction perpendicular to the length of the crack or defect. If it is assumed then that inside defect 12 represents a longitudinal defect in pipe 11, it will be advantageous to detect such defects by using a unidirectional magnetic field such as that shown by arrow 13 and to effect relative movement by oscillating the magnetic responsive means back and forth over the weld line as indicated by arrow 18, while at the same time progressively moving pipe 11 axially with respect to the magnetic responsive means.

Such relative and progressive movement is shown in FIG. 2, where pipe 19 has weld line 21 formed therein. Relative and progressive movement of the pipe with respect to the magnetic responsive means would be effected in the direction of arrow 22 while the magnetic responsive means would also be relatively oscillated back and forth and closely adjacent to the surface of pipe 19, so that the magnetic responsive means would follow a path indicated by arrow 23.

Another use of the invention is shown in FIG. 3, where another pipe, such as drill pipe 24, is shown with transverse inside defect 26. Positioned closely adjacent the outside wall surface of pipe 24 is magnetic responsive means, again in the form of a small search coil 27, having leads 28 and 29 connecting an amplifier (not shown). In this instance, a unidirectional magnetic field would be established in the wall of pipe 24, which field would be longitudinal to the axis of the pipe by conventional magnetizing means (not shown). Relative and progressive movement between coil 27 and pipe 24 would then be effected in the direction of arrow 31.

Thus, in both FIG. 1 and FIG. 3, flux leakage that occurred as an incident of defects 12 and 26 would be detected by coils 14 and 27 respectively, and voltages would be induced therein as a result of the relative movement. It is to be understood that the term "progressively and relatively moving" includes the types of relative movement explained with respect to FIGS. 1, 2 and 3, and likewise includes relative movement which is circumferential with respect to the tubular member.

The voltage response induced in the magnetic responsive means of this invention as a result of flux leakage from the unidirectional magnetic field is a function of the location and relative size of the defect in the pipe wall. Hence, inside defects, because of their greater distance from the magnetic responsive means, will produce a voltage, the components of which are lower in frequency and amplitude than those of outside defects.

Referring to FIG. 4, there is shown a graph wherein frequency (f) is shown on the abscissa and amplitude on the ordinate. The outside defect signal component of an induced voltage is represented by curve 32, and the inside defect signal component is represented by curve 33. Hence, it is possible to filter out the high frequency portion of the outside flaw signal component as for example by the use of a high pass filter with the cut-off point for the filter being illustrated by dotted line 34 on FIG. 4.

FIG. 5 is a block diagram showing the logic circuit of one embodiment of the invention. Magnetic responsive means of the type previously described and conveniently shown in the form of search coil 35 is connected to conventional amplifier 36, which is also connected to comparator 37 by lead 38 and high pass filter 39 by lead 41. Filter 39 is also connected to comparator 42. Comparator 37 is adapted to be set at a preselected setting by potentiometer 43 while comparator 42 is likewise adjustably controlled by potentiometer 44. Comparators 37 and 42 are of the Schmitt trigger type such as that shown in Military Standardization Handbook 215, Selected Semiconductor Circuits, Dept. of Defense, U.S.A., June 15, 1960, Circuit 6–18, p. 6–63.

Potentiometer 43 would normally be set so that comparator 37 will transmit a flaw signal above a predetermined level, as for example a caution level or a reject level. Potentiometer 44 would be set to transmit a signal only if the high frequency component of the flaw signal passed by filter 39 exceeded a predetermined level. For example, filter 39 could be a high pass filter of the type to pass frequencies above line 34 in FIG. 4.

Flip-flop 46 is connected to comparator 37 by lead 47, with the letter "s" adjacent thereto indicating the set position. Flip-flop 48 is connected to comparator 42 by lead 49 with the letter "s" adjacent thereto also indicating the set position. Flip-flops 46 and 48 are of standard construction such as that shown in Military Standardization Handbook 215, Selected Semiconductor Circuits, Dept. of Defense, U.S.A., June 15, 1960, Circuit 6–6, p. 6–38.

Reset pulse generator 51, which could take one of several forms, such as a blocking oscillator, is connected to flip-flop 46 by lead 53 and to flip-flop 48 by lead 54, with the letters R thereon indicating the reset positions of flip-flops 46 and 48. Reset pulse generator 51 may be operated by automatic means, as by a clock, or by mechanical means in synchronism with the relative movement of the magnetic responsive means and the pipe being inspected. An example of a clock which could be used is shown as Circuit 6–13, page 6–52 of Military Standardization Handbook 215, cited above, which circuit shows an astable multivibrator.

An example of a blocking oscillator that may be used as the reset pulse generator is shown in the Circuit 6–10, p. 6–66, Military Standardization Handbook 215, cited above. Reset pulse generator 51, transmits electrical impulses to flip-flops 46 and 48 at stated intervals, such as once each second or in response to the relative movement of the pipe being inspected.

The logic circuit of this invention employs at least two electrical circuits, the major components of one circuit being AND circuit 56 and the major component of the other being AND circuit 57. In the set position, flip-flop 46 is connected to AND circuit 56 by lead 58 and to AND circuit 57 by lead 59. The output lead of flip-flop 46 in the reset position is to NC (no connection). The output of flip-flop 48 in the set position is connected to AND circuit 56 by lead 61, and in the reset position to AND circuit 57 by lead 62. AND circuits 56 and 57 are adapted to receive two input signals and to produce single outputs, and are of the type shown in the book Pulse and Digital Circuits by Millman and Taub, McGraw-Hill Book Co., Inc., N.Y., 1956, FIG. 13–8, p. 398.

The outputs of AND circuits 56 and 57 are respectively connected to relay drivers in the form of power amplifiers 63 and 64, which in turn are respectively connected to electrical indicator devices 66 and 67. Electrical indicator devices 66 and 67 may be in the form of colored lights, spray guns, card punchers, magnetic tape recording means, or the like. Power amplifiers 63 and 64 may be optional, depending on the signal being transmitted and the type of indicator device to be operated.

In operation, let it be assumed that comparator 37 is pre-set to transmit a flaw signal only above the reject level and comparator 42 is pre-set to transmit a signal above a predetermined base level. Assume further that coil 35 detects an outside defect at the reject level. A flaw signal will simultaneously be transmitted to comparator 37 and high-pass filter 39. Comparator 37 will transmit first electrical impulses to flip-flop 46, thereby placing it in the set position whereby electrical impulses are transmitted to AND circuits 56 and 57 by leads 58 and 59.

Simultaneously, high-pass filter 39 will transmit filtered electrical defect signals to comparator 42, which will then transmit second electrical impulses to flip-flop 48, placing it in the set position, whereby electrical impulses are transmitted to AND circuit 56 by lead 61.

At this point, AND circuit 56 will have two inputs applied to it with the result that it will produce an output to amplifier 63 which will then energize device 66, indicating an outside defect.

Meanwhile, AND circuit 57 will have received first electrical impulses from flip-flop 46, but no impulses from flip-flop 48, which was then in the set position. Hence, there will be no output from AND circuit 57 and device 67 will not be operated.

In the normal course of events, reset pulse generator 51 will then operate to place flip-flops 46 and 48 back in the reset position. Thus, the logic circuit is ready to readout another defect. The duration time of the reset pulse from blocking oscillator 51 is so short in comparision with the flaw signals that it will not interfere with the operation of flip-flops 46 and 48.

Now let it be assumed that coil 35 detects an inside defect of the reject level. A voltage will be induced in coil 35, which will be amplified in amplifier 36, and be transmitted to comparator 37 and high-pass filter 39.

Comparator 37 will transmit first electrical impulses to flip-flop 46, thereby placing it in the set position, whereby electrical impulses are transmitted to AND circuits 56 and 57 by leads 58 and 59. However, since the flaw detected is an inside defect, the voltage from amplifier 36 will have no high frequency components above the cut-off point of high-pass filter 39. Therefore, there will be no output signal from filter 39 on comparator 42. Flip-flop 48 will remain in the reset position and will be transmitting electrical impulses in inverted form to AND circuit 57 by lead 62.

Since AND circuit 57 will then be receiving two input signals, it will produce an output signal to amplifier 64, which will energize device 67, thereby indicating an inside defect. AND circuit 56 will be receiving a signal by lead 58, but none on lead 61, since flip-flop 48 remained in the reset position, hence there will be no output from AND circuit 56 and device 66 will not be energized.

It is apparent that additional comparators and AND circuits could be added to the logic circuit of this invention and thereby provide indications of various degrees or levels of defects, as for example a caution level and a reject level.

This invention has been described in relation to an inspection apparatus which could be passed along the outside surface of a pipe. It is equally admissible of use on the inside of a pipe, wherein the same principles herein taught could be applied with similar results.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. An apparatus for testing a magnetizable member for both inside and outside defects and providing a readout for such defects, comprising
   a magnetizing means for producing a unidirectional magnetic field in the wall of said member,
   magnetic responsive means positioned adjacent the outside surface of said wall for producing electrical defect signals in response to variations in flux leakage from said wall,
   means for progressively and relatively moving said magnetic responsive means adjacent to said wall during testing, and
   a logic circuit for indicating the relative size and location of defects in said wall comprising
      electrical means connected to said magnetic responsive means for producing first electrical impulses when said defect signals are above a preselected level and for producing second electrical impulses when the high frequency components of said defect signals are above another preselected level,
      said electrical means including means for inverting one of said first and second electrical impulses to produce third electrical impulses,
      first and second electrical indicator devices connected to receive said first, second and third electrical impulses such that said first device indicates outside surface defects and said second device indicates inside surface defects.

2. The apparatus claimed in claim 1 wherein:
   said electrical means has first amplitude selective means for transmitting said first electrical impulses when the amplitude of said defect signals are above a preselected level, and
   said electrical means has high-pass filter means and second amplitude selective means for transmitting said second electrical impulses when the amplitude of said high frequency components of said defect signals are above a preselected level.

3. The apparatus as claimed in claim 1 wherein:
   said electrical means includes first and second bistable elements for producing said first, second and third impulses that, once produced, remain at given values until said bistable elements are reset, and
   a reset pulse generator is connected to reset said bistable elements after indication of defects have been made on said indicator devices.

4. An apparatus for testing a magnetizable member for both inside and outside defects and providing a readout for such defects, comprising
   a magnetizing means for producing a unidirectional magnetic field in the fall of said member,
   magnetic responsive means positioned adjacent the outside surface of said wall for producing electrical defect signals in response to variations in flux leakage from said wall,
   means for progressively and relatively moving said magnetic responsive means adjacent to said wall during testing, and
   a logic circuit for indicating the relative size and location of defects in said wall comprising
      an electrical circuit connected to said magnetic responsive means for producing first electrical impulses when said defect signals are above a preselected level and for producing second electrical impulses when the high frequency components of said defect signals are above another preselected level, and
      first and second indicator devices connected to said electrical circuit, said first device being activated upon simultaneous production of said first and second electrical impulses and said second device being activated upon production of said first electrical impulses, provided said second impulses are not simultaneously produced,
      whereby said first device indicates outside surface defects and said second device indicates inside surface defects.

5. An apparatus for testing a magnetizable tubular member for both inside and outside defects and providing an indication of the relative size and location of said defects comprising:
   a magnetizing means for producing a unidirectional magnetic field in the wall of said member,
   magnetic responsive means positioned adjacent the outside surface of said wall for producing defect signals in the form of electrical voltages as an incident of variations in flux leakage from said wall caused by defects in said wall,
   motion means for progressively and relatively moving said magnetic responsive means adjacent said wall during testing,
   amplifier means connected to said magnetic responsive means for transmitting said defect signals,
   a first comparator connected to said amplifier means and adjustable for transmitting first electrical impulses when said defect signals are above a preselected level,
   a high-pass filter connected to said amplifier means for passing high frequency components of said defect signals, a second comparator connected to said filter and adjustable for transmitting second electrical impulses when the filtered defect signal exceeds a preselected level, a first flip-flop connected to said first comparator for transmitting said first electrical impulses to first and second AND circuits, a second flip-flop connected to said second comparator for transmitting said second electrical impulses to said first AND circuit and electrical impulses in inverted form to said second AND circuit, a reset pulse generator connected to said first and second flip-flops for normally maintaining said flip-flops in a reset position, a first electrical indicator device connected to said first AND circuit for indicating outside defects, and a second electrical indicator device connected to said second AND circuit for indicating inside defects.

6. The method of testing a magnetizable member for defects in the wall of said member and determining the relative size and location thereof, comprising the steps of:

establishing a unidirectional magnetic field in said wall, progressively and relatively moving the outside surface of said member adjacent to a magnetic responsive means to produce an electrical flaw signal voltage in said magnetic responsive means in response to a variation in flux leakage from said wall, applying said flaw signal voltage to a first electrical circuit for producing a first electrical impulse when the amplitude of said flaw signal voltage is above a predetermined level, simultaneously filtering said flaw signal voltage for passing the high frequency components thereof, applying said high frequency components of said flaw signal voltage to a second electrical circuit for producing a second electrical impulse when the amplitude of said high frequency components of said flaw signal voltage is above a predetermined level, and a third electrical impulse that is an inversion of said second electrical impulse, the simultaneous presence of said first and second electrical impulses indicating outside surface flaws in said member and the simultaneous presence of said first and third impulses indicating inside surface flaws in said member.

7. The method as claimed in claim 6 comprising the additional steps of:

applying said first and second electrical impulses to a first indicating device for indicating outside surface flaws in said member, and applying said first and third electrical impulses to a second indicating device for indicating inside surface flaws in said member.

References Cited

UNITED STATES PATENTS

| | | | |
|---|---|---|---|
| 1,782,462 | 11/1930 | Chappuzeau et al. | 324—37 |
| 2,848,607 | 8/1958 | Maron | 328—94 |
| 2,881,387 | 4/1959 | Wood | 324—37 |
| 3,209,243 | 9/1965 | Walters et al. | 324—34 |

RUDOLPH V. ROLINEC, *Primary Examiner.*

WALTER L. CARLSON, RICHARD B. WILKINSON, *Examiners.*

R. J. CORCORAN, *Assistant Examiner.*

UNITED STATES PATENT OFFICE
CERTIFICATE OF CORRECTION

Patent No. 3,343,079                          September 19, 1967

Alfred E. Crouch

It is hereby certified that error appears in the above numbered patent requiring correction and that the said Letters Patent should read as corrected below.

Column 4, line 58, for "transmited" read -- transmitted --; column 5, line 73, after "impulses," insert -- and --; column 6, line 26, for "fall" read -- wall --.

Signed and sealed this 27th day of August 1968.

(SEAL)
Attest:

Edward M. Fletcher, Jr.                        EDWARD J. BRENNER

Attesting Officer                               Commissioner of Patents